(No Model.)

F. W. POLLE.
BEER FAUCET.

No. 322,318. Patented July 14, 1885.

Witnesses.                 Inventor.
Sam'l R. Turner           Friedrich W. Polle
W. J. Osgood              by Israel A. Snow,
                                       Att'y.

UNITED STATES PATENT OFFICE.

FRIEDERICH W. POLLE, OF GREENVILLE, MISSISSIPPI.

BEER-FAUCET.

SPECIFICATION forming part of Letters Patent No. 322,318, dated July 14, 1885.

Application filed August 14, 1883. Renewed June 5, 1885. (No model.)

*To all whom it may concern:*

Be it known that I, FRIEDERICH W. POLLE, of Greenville, in the county of Washington and State of Mississippi, have invented a new and useful Improvement in Beer-Faucets; and I do hereby declare that the following is a full, clear, and exact description of the invention, which will enable others skilled in the art to which it appertains to make and use it, reference being had to the accompanying drawings, forming a part thereof.

Figure 1:
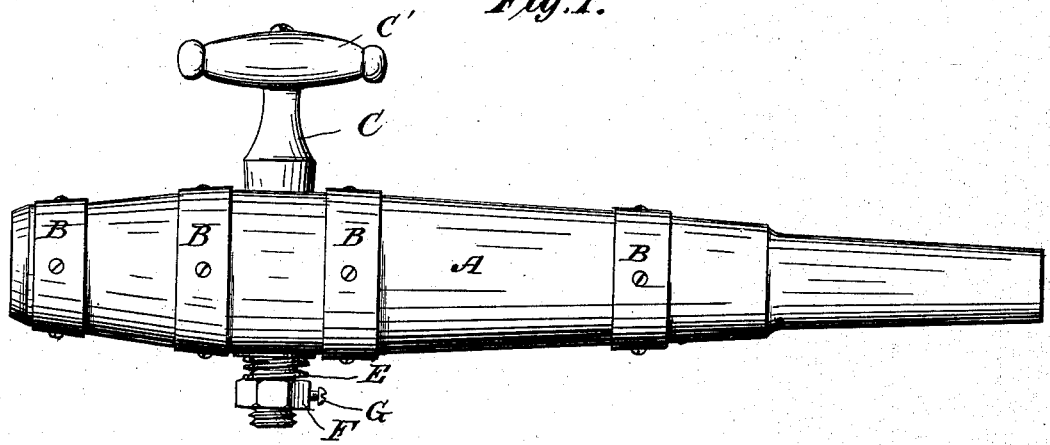
Figure 2:
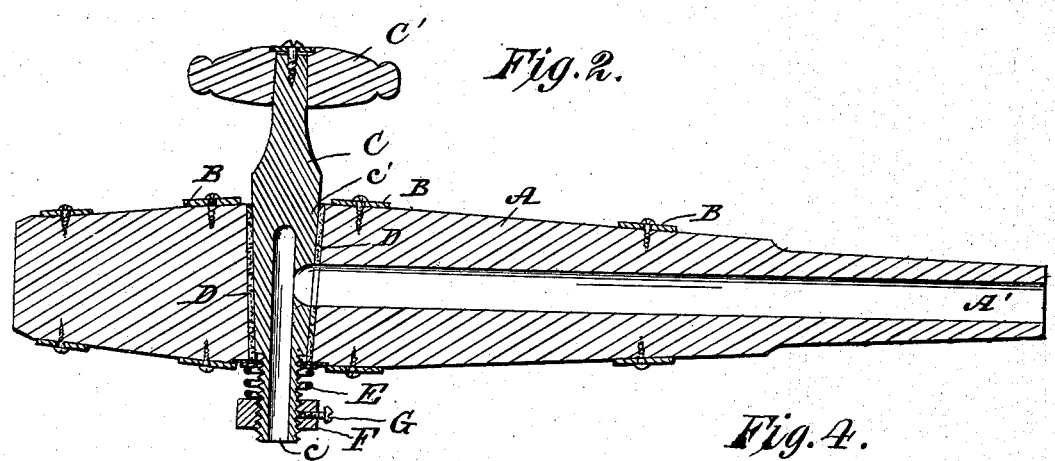

I attain these objects by the mechanism illustrated in the accompanying drawings, in which Figure 1 is a longitudinal view of my improved faucet; Fig. 2, a sectional view of the same, and Figs. 3 and 4 are views in detail.

Similar letters refer to similar parts throughout the several views.

A represents an ordinary wooden faucet, in which is a hole, A'. B B B are bands of metal secured around the faucet at different points by means of screws or other devices for the purpose of strengthening the same. C is the cock or stopper, fitting into a hole, $c'$, made in the faucet A, and which is made of block-tin, for the purpose of preventing corrosion or rust. The said cock is provided with a hole, $c$, which when turned in the proper direction registers with the hole A' of the faucet A, thereby allowing the liquid to be drawn off or run out, and when turned in an opposite direction closes the same. The cock C is provided with an ordinary handle, C', properly secured by any well-known means. The lower part of the cock is screw-threaded for the purpose of receiving a nut, F, which is held stationary or locked by means of a set-screw, G.

Figures 3, 4:
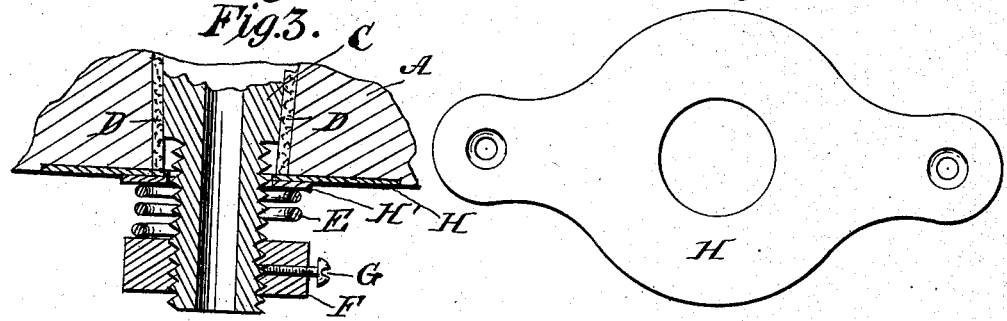

To the under side of the barrel of the faucet is secured a metallic plate, H, substantially of the form shown in Fig. 4 of the drawings, the office of which is to preserve the faucet from becoming worn about the spigot, and also to serve as wearing-surface for the washer H', fitted to the spigot, and serving as a wearing-base for the spiral spring E, arranged about the ends of the spigot and between the nut F and washer H'. It will thus be seen that the wood of the faucet is protected and preserved by the introduction of removable wearing appliances which preserve the integrity and utility of the whole device. The nut F is adjusted to the threaded end of the spigot and against the interposed spring E, the effect being to draw the spigot tight in its aperture and maintain it in such condition.

To prevent the nut F from becoming loose or detached by the frequent turnings of the spigot, I provide it with the set-screw G, which sets against the threaded end of the spigot and secures the nut in any fixed position.

Around the hole $c'$ in the faucet A is fitted a packing of leather, D, or other suitable material, which keeps the cock when closed air-tight, and thus prevents any air from entering the barrel from which the liquid is drawn.

Having thus described my invention, what I claim as new, and desire to secure by Letters Patent, is—

1. The faucet A, provided with a packing, D, and plate H, secured to the under side of the faucet, and the spigot C, with a threaded end, in combination with the spiral spring E and nut F, fitted to the threaded end of the spigot, and held in a fixed position by the set-screw G, substantially as and for the purpose set forth.

2. The faucet A, provided with a packing, D, and plate H, secured to the under side of the faucet, and the spigot C, having the threaded end provided with a threaded nut, F, with set-screw G, in combination with the spiral spring E and wearing-washer H', substantially as described, and for the purpose set forth.

In testimony that I claim the foregoing I append my signature.

FRIEDERICH W. POLLE.

Witnesses:
W. D. MCKENNA,
W. J. OSGOOD.